US012561354B2

(12) United States Patent
Wang et al.

(10) Patent No.: US 12,561,354 B2
(45) Date of Patent: Feb. 24, 2026

(54) SYSTEMS AND METHODS FOR ITEM-SPECIFIC KEYWORD RECOMMENDATION

(71) Applicant: Walmart Apollo, LLC, Bentonville, AR (US)

(72) Inventors: Zigeng Wang, Santa Clara, CA (US); Jae Young Kim, Sunnyvale, CA (US); Yaotong Cai, Campbell, CA (US); Xia Zhao, Santa Clara, CA (US); Wei Shen, Pleasanton, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 375 days.

(21) Appl. No.: 18/104,083

(22) Filed: Jan. 31, 2023

(65) Prior Publication Data

US 2024/0256584 A1      Aug. 1, 2024

(51) Int. Cl.
*G06F 16/3332* (2025.01)
*G06F 40/30* (2020.01)

(52) U.S. Cl.
CPC .......... *G06F 16/3334* (2019.01); *G06F 40/30* (2020.01)

(58) Field of Classification Search
CPC .......... G06F 40/20; G06F 40/30; G06F 40/40; G06F 40/00; G06F 16/33; G06F 16/332; G06F 16/3331; G06F 16/3334; G06F 16/3338; G06F 16/9535; G06F 16/951; G06F 16/3347; G06F 16/35; G06F 16/583; G06F 16/532; G06F 16/3344; G06F 16/353; G06F 16/338; G06F 16/90332; G06F 16/5866; G06F 16/285; G06F 16/24573; G06F 16/3329; G06F 16/313; G06N 20/00

USPC .......................................................... 704/1–9
See application file for complete search history.

(56) References Cited

U.S. PATENT DOCUMENTS

| | | | | |
|---|---|---|---|---|
| 11,301,540 | B1 | 4/2022 | Boteanu et al. | |
| 2013/0290320 | A1 | 10/2013 | Zhu et al. | |
| 2016/0350283 | A1* | 12/2016 | Carus ................... | G06F 40/284 |
| 2021/0042366 | A1* | 2/2021 | Hicklin .................. | G06N 3/08 |
| 2021/0200956 | A1* | 7/2021 | Ding ...................... | G06F 40/30 |

FOREIGN PATENT DOCUMENTS

| | | |
|---|---|---|
| CN | 106844371 A | 6/2017 |
| CN | 110472140 A | 11/2019 |
| KR | 20210068214 A | 6/2021 |

* cited by examiner

*Primary Examiner* — Leshui Zhang
(74) *Attorney, Agent, or Firm* — Morgan, Lewis & Bockius LLP; Manita Rawat

(57) ABSTRACT

Systems and methods of item-specific keyword recommendation are disclosed. An item data structure including an item title is received and at least one item embedding is generated by applying a first trained semantic mapping model to the item title. The first trained semantic mapping model includes a first semantic mapping framework. The at least one item embedding is compared to a set of keyword embeddings representative of a set of platform-relevant keywords and a set of item-specific recommended keywords is selected from the set of platform-relevant keywords based on a similarity between the at least one item embedding and each embedding in the set of keyword embeddings. The item title is modified to include at least one of the set of item-specific recommended keywords and an interface including the modified item title is generated.

21 Claims, 13 Drawing Sheets

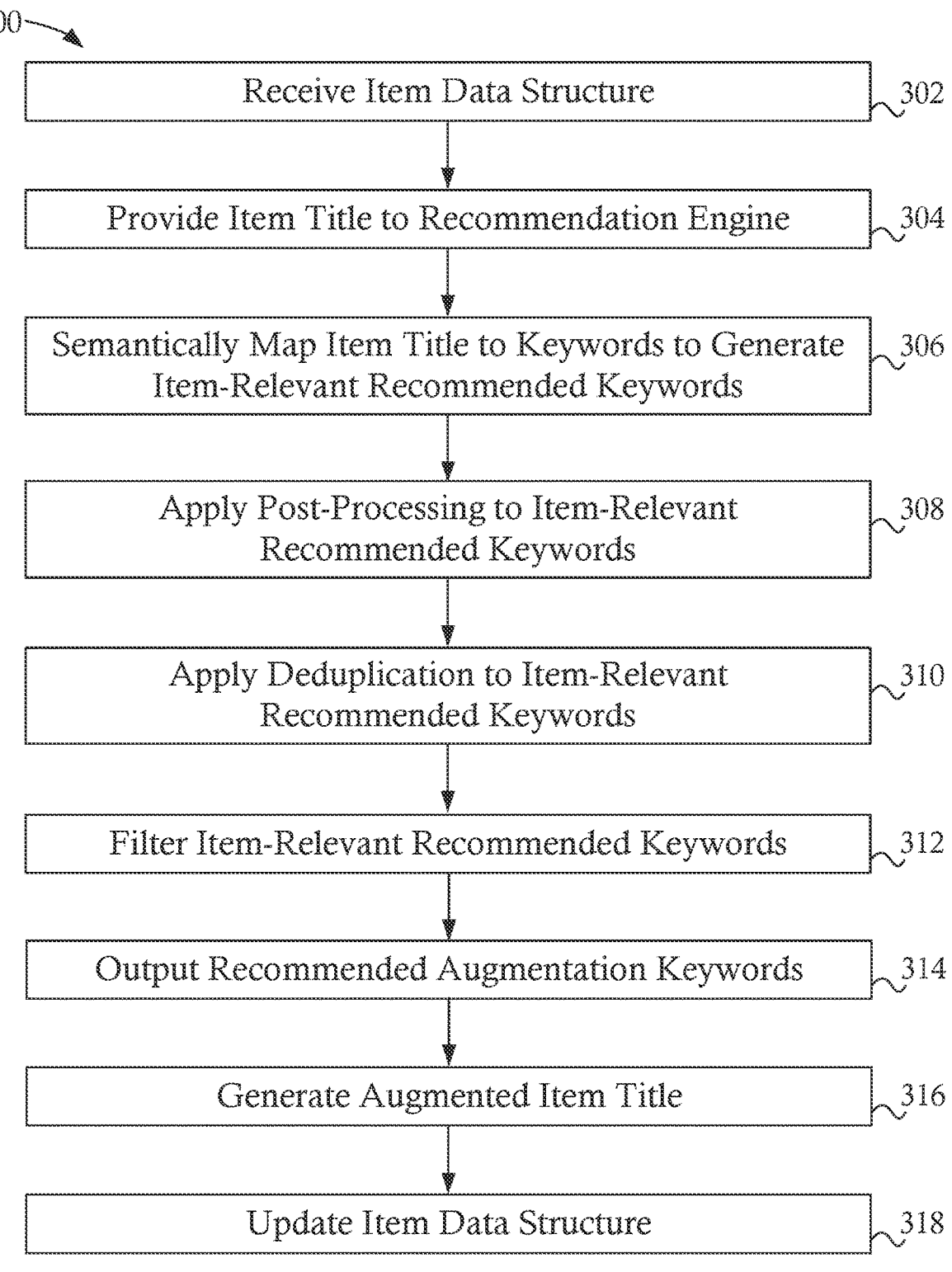

300

Receive Item Data Structure ⌇302

Provide Item Title to Recommendation Engine ⌇304

Semantically Map Item Title to Keywords to Generate Item-Relevant Recommended Keywords ⌇306

Apply Post-Processing to Item-Relevant Recommended Keywords ⌇308

Apply Deduplication to Item-Relevant Recommended Keywords ⌇310

Filter Item-Relevant Recommended Keywords ⌇312

Output Recommended Augmentation Keywords ⌇314

Generate Augmented Item Title ⌇316

Update Item Data Structure ⌇318

SYSTEMS AND METHODS FOR ITEM-SPECIFIC KEYWORD RECOMMENDATION

TECHNICAL FIELD

This application relates generally to keyword recommendation, and more particularly, to keyword recommendation for optimized search engine results.

BACKGROUND

Current search engines utilize information available on network interfaces to determine a correspondence between search terms and indexed pages. For example, in the context of searching item catalogs, current search engines compare search terms against source content contained on interface pages, database records, and/or other data representations of items within a catalog. Data representations having accurate and robust data are more likely to be matched during a search, while sparse data representations are less likely to be matched.

Network pages within a single network interface can have varying levels of detail. For example, in the context of item catalogs, item data generated by a first party can include detailed, accurate, and robust descriptions and content, while similar item data generated by other parties, e.g., third parties, can lack adequate detail and can potentially fail to include any description at all. The lack of detail causes such item data to perform poorly in optimized search processes.

SUMMARY

In various embodiments, a system is disclosed. The system includes a non-transitory memory and a processor communicatively coupled to the non-transitory memory. The processor is configured to read a set of instructions to receive an item data structure including an item title and generate at least one item embedding by applying a first trained semantic mapping model to the item title. The first trained semantic mapping model includes a first semantic mapping framework. The processor is further configured to read the set of instructions to compare the at least one item embedding to a set of keyword embeddings representative of a set of platform-specific keywords, select a set of recommended augmentation keywords from the set of keywords based on a similarity between the at least one item embedding and each embedding in the set of keyword embeddings, modify the item title to include at least one of the set of recommended augmentation keywords and update the item data structure to include the modified item title. A search query is received and an interface responsive to the search query is generated. The interface includes the item data structure and the modified item title.

In various embodiments, a computer-implemented method is disclosed. The method includes steps of receiving an item data structure including an item title and generating at least one item embedding by applying a first trained semantic mapping model to the item title. The first trained semantic mapping model includes a first semantic mapping framework. The method further includes the steps of comparing the at least one item embedding to a set of keyword embeddings representative of a set of platform-specific keywords, selecting a set of recommended augmentation keywords from the set of keywords based on a similarity between the at least one item embedding and each embedding in the set of keyword embeddings, modifying the item title to include at least one of the set of recommended augmentation keywords, updating the item data structure to include the modified item title, receiving a search query, and generating an interface responsive to the search query. The interface includes the item data structure and the modified item title.

In various embodiments, a non-transitory computer-readable medium having instructions stored thereon is disclosed. The instructions, when executed by at least one processor, cause a device to perform operations including receiving an item data structure including an item title and generating at least one item embedding by applying a first trained semantic mapping model to the item title. The first trained semantic mapping model includes a first semantic mapping framework. The instructions further cause the device to perform operations including generating a set of keyword embeddings for a set of platform-specific keywords by applying a second trained semantic mapping model to each keyword in the set of platform-specific keywords. The second trained semantic mapping model includes the first semantic mapping framework. The instructions further cause the device to perform operations including determining a pairwise distance between the at least one item embedding and each embedding in the set of keyword embeddings in vector space and selecting a set of recommended augmentation keywords from the set of keywords based on a similarity between the at least one item embedding and each embedding in the set of keyword embeddings. The set of recommended augmentation keywords includes keywords associated with keyword embeddings located within a predetermined pairwise distance of the at least one item embedding in vector space. The instructions further cause the device to perform operations including modifying the item title to include at least one of the set of recommended augmentation keywords, updating the item data structure to include the modified item title, receiving a search query, and generating an interface responsive to the search query. The interface includes the item data structure and the modified item title.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIG. 7 is a flowchart illustrating a method of generating keyword-augmented titles, in accordance with some embodiments.

DETAILED DESCRIPTION

Figure 1:
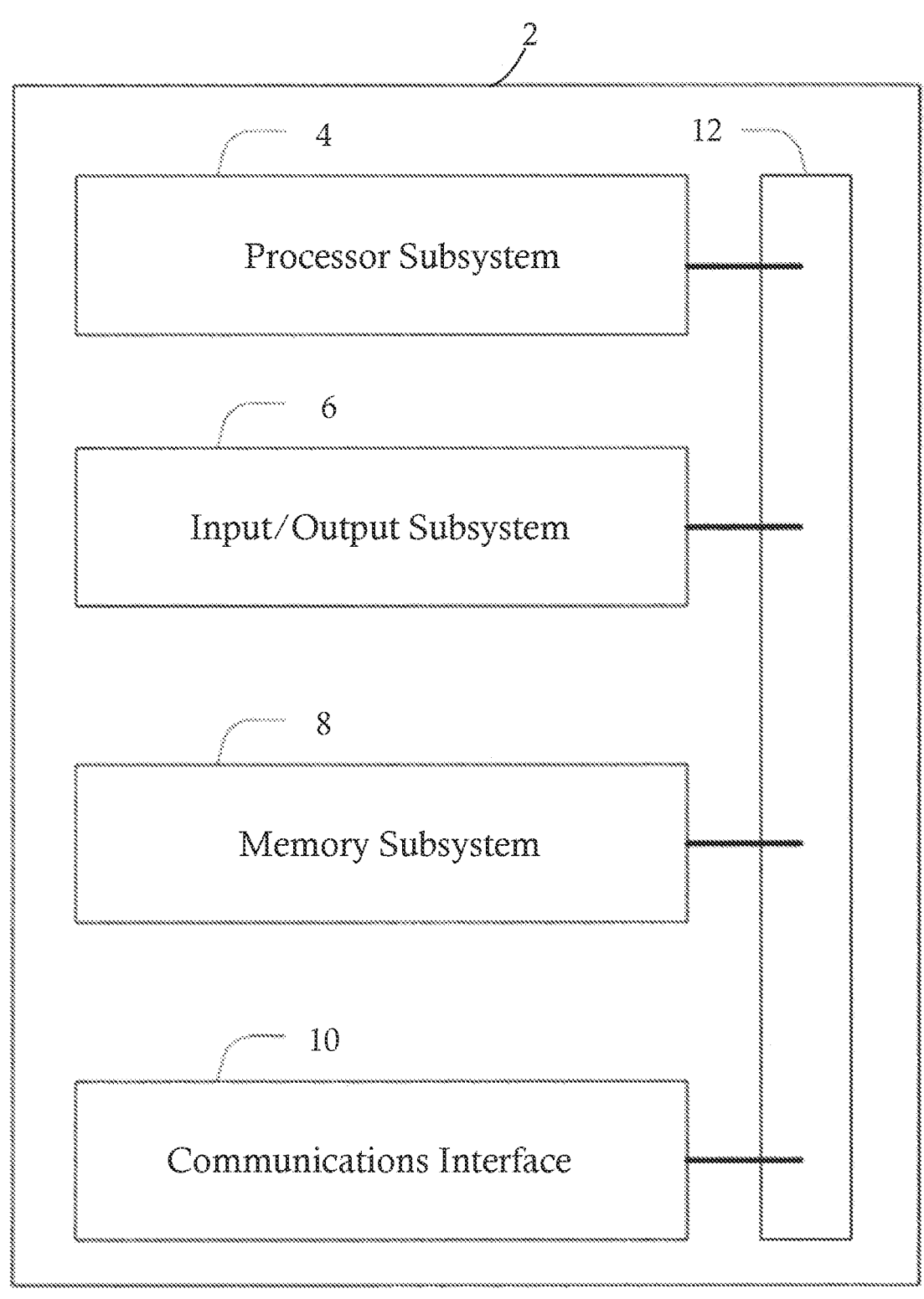
FIG. 1 illustrates a computer system configured to implement one or more processes, in accordance with some embodiments.

This description of the exemplary embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for generating item-specific keyword recommendations. In various embodiments, a semantic mapping process generates a set of item-relevant keywords from a pool of platform-relevant keywords. The set of item-relevant keywords can include keywords having a semantic match to an element of item data of an item, such as an item title. A set of item-specific recommended keywords is selected from the set of item-relevant keywords using one or more filtering processes, such as post processing, keyword deduplication, and/or saliency detection. In some embodiments, the set of item-specific recommended keywords includes highlighted (e.g., emphasized) sub-words or terms and/or specifically filtered keyword recommendations. An augmented item title is generated by inserting one or more of the item-specific recommended keywords into the item title.

In some embodiments, systems and methods for generating item-specific keyword recommendations include a trained semantic mapping model configured to identify a set of semantically similar and/or semantically relevant keywords. The semantic mapping model includes a trained semantic model, such as, for example, a two-tower model. Although specific embodiments are discussed herein, it will be appreciated that any suitable semantic mapping or comparison model can be used.

In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network, or a convolutional deep neural network. Furthermore, a neural network can be an adversarial network, a deep adversarial network and/or a generative adversarial network.

In various embodiments, a neural network which is trained (e.g., configured or adapted) to generate a set of item-relevant keywords, is disclosed. A neural network trained to generate set of item-relevant keywords may be referred to as a trained semantic mapping network and/or a trained semantic mapping model. The trained semantic mapping model can be configured to receive an item title and/or a set of platform-relevant keywords, generate embeddings for the item title and/or the platform-relevant keywords, and identify a set of item-relevant keywords based on the generated embeddings.

FIG. 1 illustrates a computer system configured to implement one or more processes, in accordance with some embodiments. The system 2 is a representative device and can include a processor subsystem 4, an input/output subsystem 6, a memory subsystem 8, a communications interface 10, and a system bus 12. In some embodiments, one or more than one of the system 2 components can be combined or omitted such as, for example, not including an input/output subsystem 6. In some embodiments, the system 2 can include other components not combined or comprised in those shown in FIG. 1. For example, the system 2 can also include, for example, a power subsystem. In other embodiments, the system 2 can include several instances of the components shown in FIG. 1. For example, the system 2 can include multiple memory subsystems 8. For the sake of conciseness and clarity, and not limitation, one of each of the components is shown in FIG. 1.

The processor subsystem 4 can include any processing circuitry operative to control the operations and performance of the system 2. In various aspects, the processor subsystem 4 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also can be implemented by a controller, a microcontroller, an application specific integrated circuit (ASIC), a field programmable gate array (FPGA), a programmable logic device (PLD), and so forth.

In various aspects, the processor subsystem 4 can be arranged to run an operating system (OS) and various applications. Examples of an OS comprise, for example, operating systems generally known under the trade name of Apple OS, Microsoft Windows OS, Android OS, Linux OS, and any other proprietary or open-source OS. Examples of applications comprise, for example, network applications, local applications, data input/output applications, user interaction applications, etc.

In some embodiments, the system 2 can include a system bus 12 that couples various system components including the processor subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

In some embodiments, the input/output subsystem 6 can include any suitable mechanism or component to enable a user to provide input to system 2 and the system 2 to provide output to the user. For example, the input/output subsystem 6 can include any suitable input mechanism, including but not limited to, a button, keypad, keyboard, click wheel, touch screen, motion sensor, microphone, camera, etc.

In some embodiments, the input/output subsystem 6 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 2. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 4. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 can include any suitable hardware, software, or combination of hardware and software that is capable of coupling the system 2 to one or more networks and/or additional devices.

The communications interface 10 can be arranged to operate with any suitable technique for controlling information signals using a desired set of communications protocols, services, or operating procedures. The communications interface 10 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 can include a wireless interface comprising one or more antennas, transmitters, receivers, transceivers, amplifiers, filters, control logic, and so forth.

In various aspects, the communications interface 10 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac/ax/be, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, the Wi-Fi series of protocols including Wi-Fi Legacy, Wi-Fi 1/2/3/4/5/6/6E, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electro-magnetic induction (EMI) techniques. An example of EMI techniques can include passive or active radio-frequency identification (RFID) protocols and devices. Other suitable protocols can include Ultra-Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 can include any machine-readable or computer-readable media capable of storing data, including both volatile/non-volatile memory and removable/non-removable memory. The memory subsystem 8 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 2.

In various aspects, the memory subsystem 8 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferro-electric polymer memory), phase-change memory (e.g., ovonic memory), ferroelectric memory, silicon-oxide-ni-tride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 can contain an instruction set, in the form of a file for executing various methods, such as methods for generating item-specific recommended keywords, as described herein. The instruction set can be stored in any acceptable form of machine-readable instructions, including source code or various appropriate programming languages. Some examples of programming languages that can be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processor subsystem 4.

Figure 2:
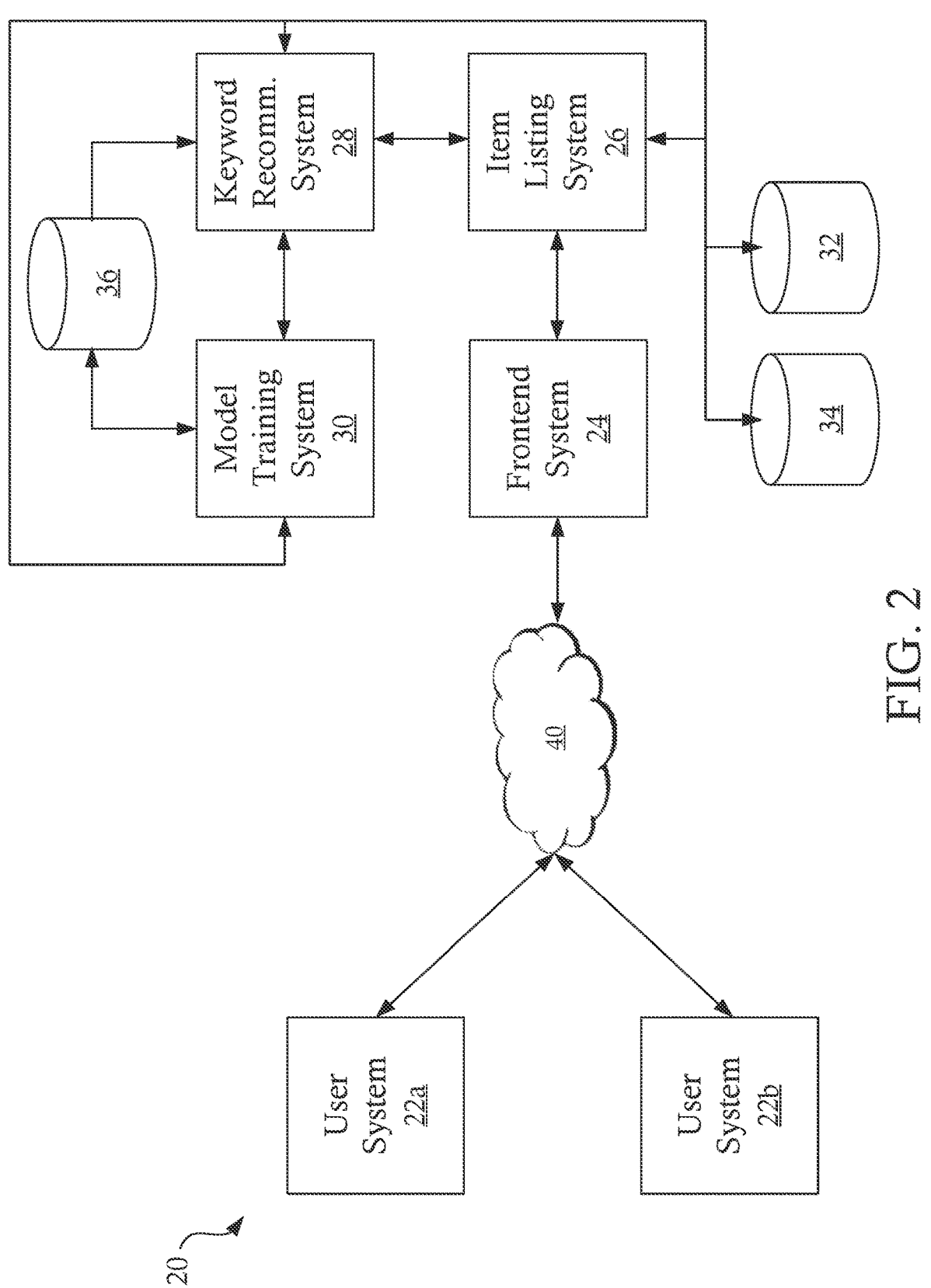
FIG. 2 illustrates a network environment configured to provide item-specific keyword recommendations and interfaces including augmented item titles, in accordance with some embodiments.

FIG. 2 illustrates a network environment 20 configured to provide an interface including items having titles or descriptions containing item-specific keyword recommendations, in accordance with some embodiments. The network environment 20 includes a plurality of systems configured to communicate over one or more network channels, illustrated as network cloud 40. For example, in various embodiments, the network environment 20 can include, but is not limited to, one or more user systems 22a, 22b, a frontend system 24, an item listing system 26, a keyword recommendation system 28, a model training system 30, an item database 32, a keyword database 34, a model store database 36, and/or any other suitable systems. It will be appreciated that any of the illustrated systems can include a system as described above in conjunction with FIG. 1. Although specific embodiments are discussed, herein it will be appreciated that additional systems, servers, storage mechanism, etc. can be included within the network environment 20.

Further, although embodiments are illustrated herein having individual, discrete systems, it will be appreciated that, in some embodiments, one or more systems can be combined into a single logical and/or physical system. For example, in various embodiments, the frontend system 24, the item listing system 26, the keyword recommendation system 28, the model training system 30, the item database 32, the keyword database 34, and/or the model store database 36 can be combined into a single logical and/or physical system. Similarly, although embodiments are illustrated having a single instance of each system, it will be appreciated that additional instances of a system can be implemented within the network environment 20. In some embodiments, two or more systems can be operated on shared hardware in which each system operates as a separate, discrete system utilizing the shared hardware, for example, according to one or more virtualization schemes.

In some embodiments, the user systems 22a, 22b are operable by one or more users to access a network interface provided by the frontend system 24. The network interface can include any suitable interface, such as, for example, a web or internet-based interface configured to provide one or more interface pages (e.g., webpages) for user interaction. Examples of network interfaces can include, but are not limited to, e-commerce interfaces, service interfaces, and/or any other suitable network interface. The frontend system 24 can be configured to provide any suitable resources required for generation and operation of the network interface, such as, for example, one or more components of a server.

In some embodiments, the frontend system 24 includes an interface generation engine configured to provide a network interface, such as a webpage, configured to allow an operator of a user system 22a, 22b to add additional items to the item database. For example, in some embodiments, the frontend system 24 is configured to generate an interface for receiving item data from a user system 22a, 22b. The item data can include item names, titles, descriptions, images, and/or any other suitable data associated with an item. In some embodiments, the item data is provided to an item listing system 26 that is configured to generate an item record for the uploaded item in a database, such as the item database 32, that adds the item represented by the item data to a catalog of items presented through a second interface, such an e-commerce interface.

In some embodiments, the frontend system 24 is configured to generate an interface including one or more items having an augmented item title. For example, a user system 22*a* can request an interface including one or more items selected from a catalog, such as a search interface including search results selected from an item catalog related to a search query. The frontend system 24 is configured to generate an interface including item data for a set of items selected form the item catalog. At least one of the selected items includes a title previously augmented by incorporating one or more item-specific recommended keywords into the title, as discussed herein.

In some embodiments, a keyword recommendation system 28 is configured to modify or augment titles of items, such as items being added to a catalog via the item listing system 26 and/or items stored in the item database 32. The keyword recommendation system 28 can be configured to enhance incomplete and/or unoptimized item titles. For example, in some embodiments, the keyword recommendation system 28 is configured to obtain item data from a user system 22*a*, 22*b* and/or from the item database 32, generate a set of recommended keywords for altering, adding to, or otherwise modifying the title of an item, and, in some embodiments, automatically update the title of the item to include at least one of the item-specific recommended keywords.

In various embodiments, the system or components thereof can comprise or include various modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the examples herein.

Figure 3:
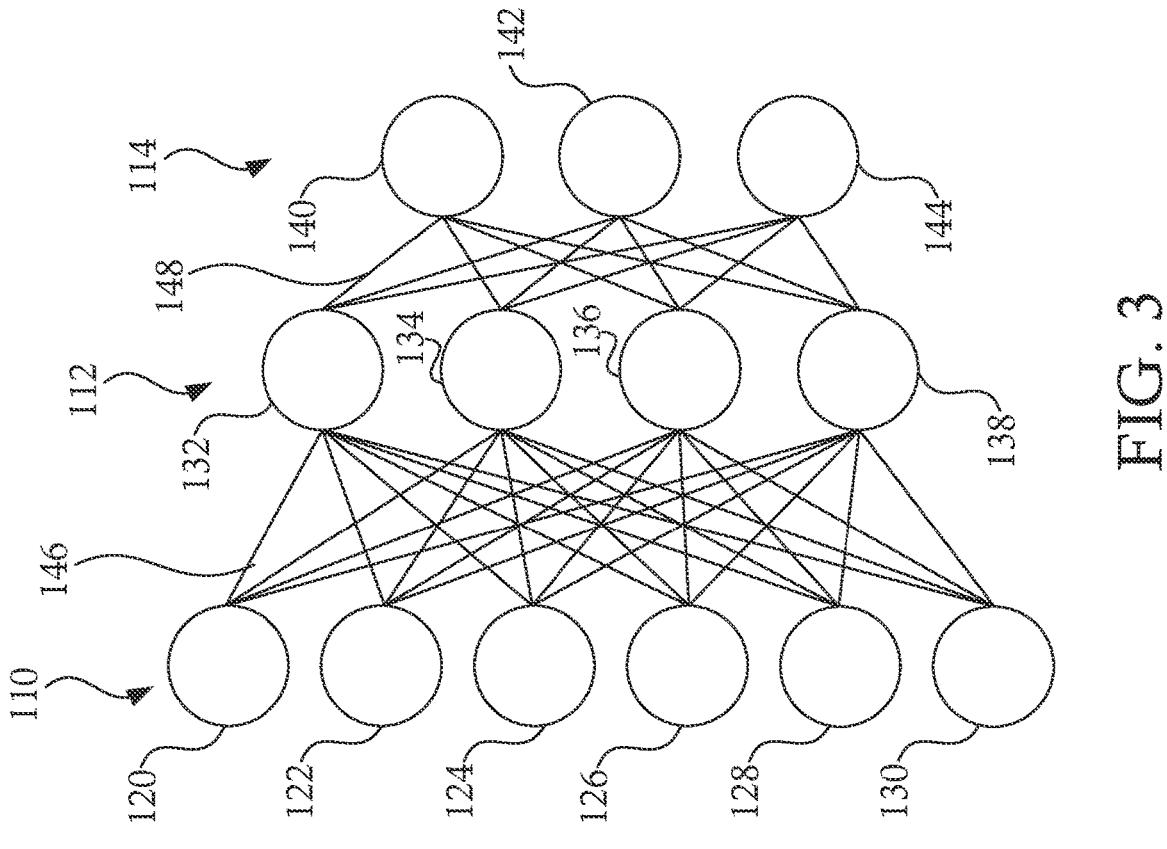
FIG. 3 illustrates an artificial neural network, in accordance with some embodiments.

FIG. 3 illustrates an artificial neural network 100, in accordance with some embodiments. Alternative terms for "artificial neural network" are "neural network," "artificial neural net," "neural net," or "trained function." The neural network 100 comprises nodes 120-144 and edges 146-148, wherein each edge 146-148 is a directed connection from a first node 120-138 to a second node 132-144. In general, the first node 120-138 and the second node 132-144 are different nodes, although it is also possible that the first node 120-138 and the second node 132-144 are identical. For example, in FIG. 3 the edge 146 is a directed connection from the node 120 to the node 132, and the edge 148 is a directed connection from the node 132 to the node 140. An edge 146-148 from a first node 120-138 to a second node 132-144 is also denoted as "ingoing edge" for the second node 132-144 and as "outgoing edge" for the first node 120-138.

The nodes 120-144 of the neural network 100 can be arranged in layers 110-114, wherein the layers can comprise an intrinsic order introduced by the edges 146-148 between the nodes 120-144. In particular, edges 146-148 can exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 can be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number can be assigned as a value to every node 120-144 of the neural network 100. Here, $x_i^{(n)}$ denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 146-148 can comprise a weight being a real number, in particular, the weight is a real number within the interval $[-1, 1]$, within the interval $[0, 1]$, and/or within any other suitable interval. Here, $$w_{i,j}^{(m,n)}$$

denotes the weight of the edge between the i-th node 120-138 of the m-th layer 110, 112 and the j-th node 132-144 of the n-th layer 112, 114. Furthermore, the abbreviation $$w_{i,j}^{(n)}$$

11 is defined for the weight $$w_{i,j}^{(n,n+1)}.$$

In particular, to calculate the output values of the neural network 100, the input values are propagated through the neural network. In particular, the values of the nodes 132-144 of the (n+1)-th layer 112, 114 can be calculated based on the values of the nodes 120-138 of the n-th layer 110, 112 by $$x_j^{(n+1)} = f\left(\sum_i x_i^{(n)} \cdot w_{i,j}^{(n)}\right)$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 can be calculated based on the values of the input layer 110 of the neural network and/or based on the values of a prior hidden layer, etc.

In order to set the values $$w_{i,j}^{(m,n)}$$

for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w_{i,j}^{\prime(n)} = w_{i,j}^{(n)} - \gamma \cdot \delta_j^{(n)} \cdot x_j^{(n)}$$

wherein $\gamma$ is a learning rate, and the numbers $$\delta_j^{(n)}$$

can be recursively calculated as $$\delta_j^{(n)} = \left(\sum_k \delta_k^{(n+1)} \cdot w_{j,k}^{(n+1)}\right) \cdot f'\left(\sum_i x_i^{(n)} \cdot w_{i,j}^{(n)}\right)$$

12 based on $\delta_j^{(n+1)}$, if the (n+1)-th layer is not the output layer, and $$\delta_j^{(n)} = \left(x_k^{(n+1)} - t_j^{(n+1)}\right) \cdot f'\left(\sum_i x_i^{(n)} \cdot w_{i,j}^{(n)}\right)$$

if the (n+1)-th layer is the output layer 114, wherein f' is the first derivative of the activation function, and $$y_j^{(n+1)}$$

is the comparison training value for the j-th node of the output layer 114.

Figure 4:
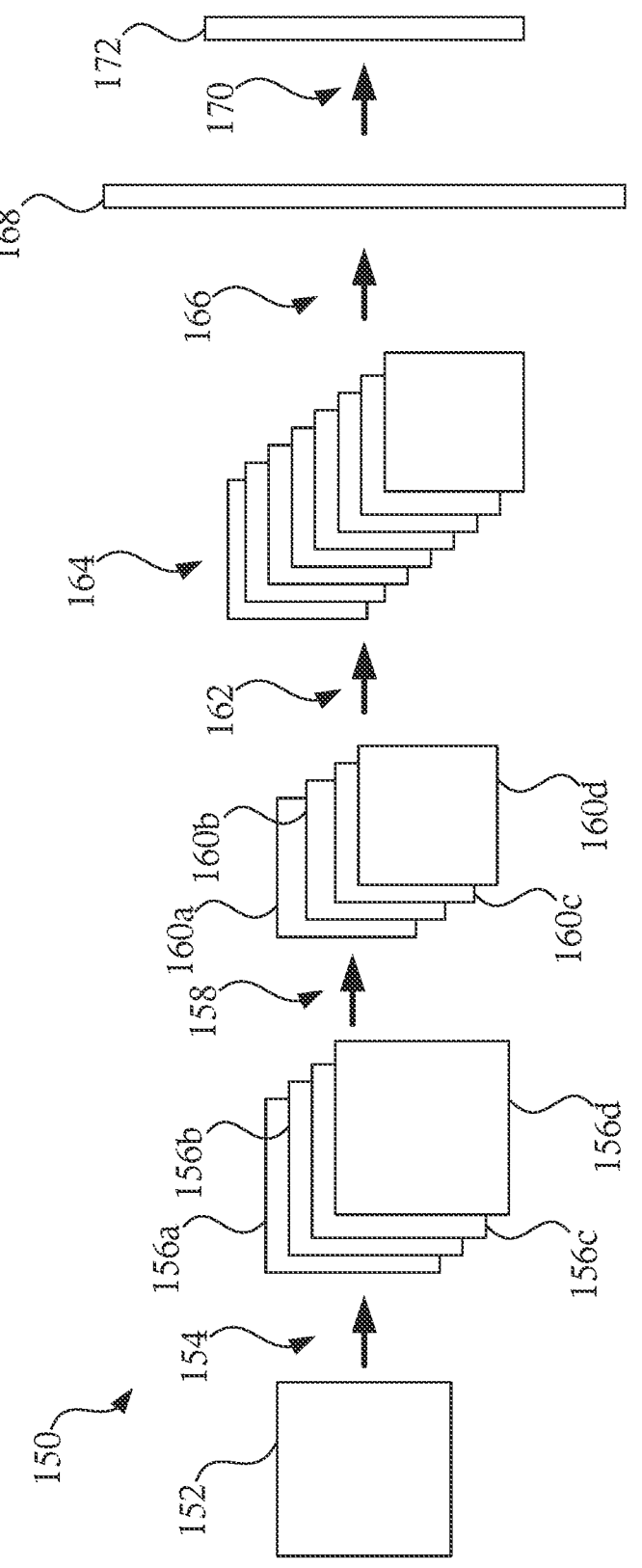
FIG. 4 illustrates a convolutional neural network, in accordance with some embodiments.

FIG. 4 illustrates a convolutional neural network (CNN) 150 including an input layer 152, a plurality of hidden layers, and an output layer 172, in accordance with some embodiments. The CNN 150 includes an input layer 152 configured to receive an input. The input includes a tensor having a shape, e.g., a set number of inputs, an input height, input width, and input channels. One or more first convolutions 154 are applied to the input layer 152 to generate a set of feature maps 156a-156d. Feature maps 156a-156d, also referred to as activation maps, include a shape having a number of inputs, a feature map height, a feature map width, and feature map channels.

After generating the set of feature maps 156a-156d, the CNN 150 implements subsampling 158 of the set of feature maps 156a-156d to generate smaller feature maps 160a-160d, e.g., to generate a pooling layer 160. A second convolution 162 is applied to the pooling layer 160 to generate additional feature maps 164. It will be appreciated that any number of additional convolutions or subsampling can be applied to generate any additional number of feature maps or pooling layers.

The feature maps 164 are mapped 166 to a fully connected layer 168 and the fully connected layer 168 is mapped 170 to an output layer 172. The fully connected layer 168 includes a layer in which every neuron in a first layer, e.g., the feature map layer 164, is connected to a neuron in another layer, e.g., the fully connected layer 168. In some embodiments, the fully connected layer 168 is similar to a traditional multilayer perceptron neural network.

Figure 5:
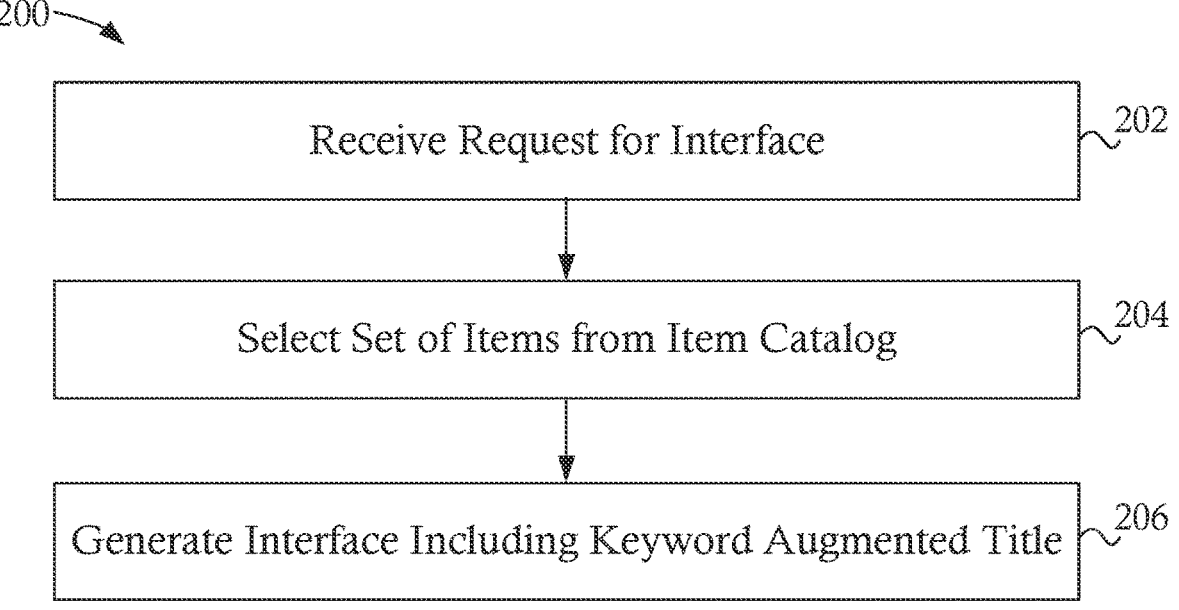
FIG. 5 is a flowchart illustrating a method of generating an interface including items having augmented titles, in accordance with some embodiments.
Figure 6:
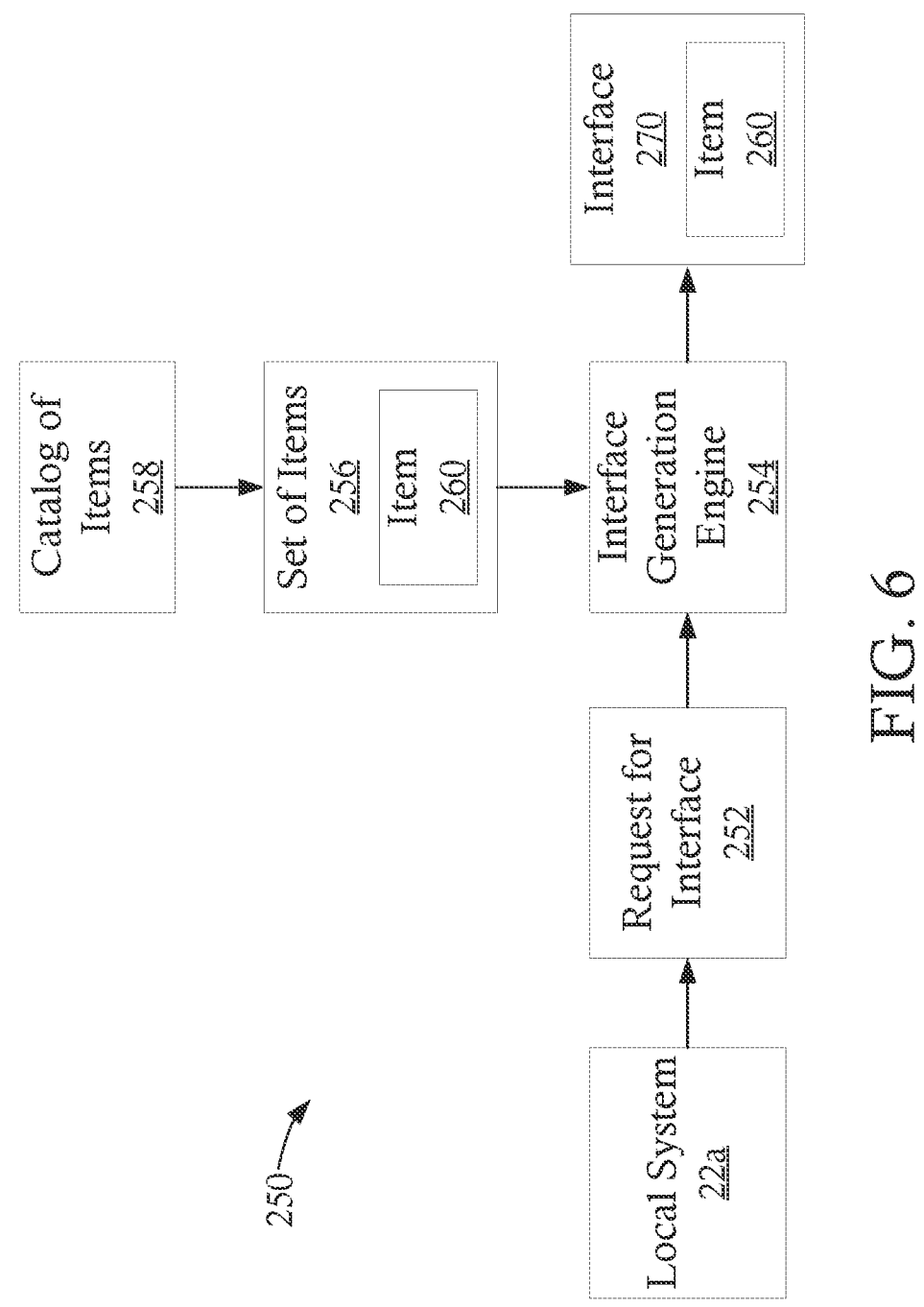
FIG. 6 is a process flow illustrating various steps of the method of generating an interface including items having augmented titles, in accordance with some embodiments.

FIG. 5 is a flowchart illustrating a method 200 of generating an interface including items having augmented titles, in accordance with some embodiments. FIG. 6 is a process flow 250 illustrating various steps of the method 200 of generating an interface including items having augmented titles, in accordance with some embodiments. At step 202, a request 252 for an interface is received. The request can be generated by any suitable system, such as, for example, a user system 22a, 22b. The request 252 can be for any suitable network interface, such as, for example, a webpage, application interface, intranet interface, etc. In some embodiments, the request 252 can include identifiers, such as a system identifier and/or a user identifier, configured to associate the request 252 with a specific system, e.g., user system 22a, and/or a specific user.

In some embodiments, the requested interface includes items stored within a catalog associated with the requested interface. For example, the requested interface can include an e-commerce interface and the request 252 can include a request for items stored in a product or item catalog associated with the e-commerce platform. In some embodiments, the request 252 can include a search query having one or more search terms defining the set of requested items. In some embodiments, the request 252 can include a request for a webpage including a set of containers configured to display items selected from a catalog associated with the interface, such as, for example, recommended items. Although specific embodiments are discussed herein, it will be appreciated that any suitable interface including one or more items selected from a catalog can be presented and are within the scope of this disclosure.

In some embodiments, the request 252 is received by an interface generation engine 254. The interface generation engine 254 is configured to receive the request 252 and generate an interface, as discussed in greater detail below. In some embodiments, the interface generation engine 254 is configured to obtain one or more template or default pages and populate the template with user-specific, search-specific, context-specific, and/or other customized content, including one or more items selected from a catalog of items associated with the interface generation engine 254.

At step 204, a set of items 256 is selected from a catalog of items 258. For example, in some embodiments, the request 252 includes a search query and the set of items 256 includes the set of items that best match the search query. As another example, in some embodiments, the request 252 includes a personalization identifier, such as a user identifier, and the set of items 256 includes a set of customized items selected for display based on the personalization identifier. As yet another example, in some embodiments, the set of items 256 can be selected based on a context of the interface, such as a seasonal campaign, a set of items related to specific portions of an interface, a set of items related to a user or interface context, etc.

The selected set of items 256 includes at least one item 260 having an augmented title. As discussed in greater detail below, items added to the catalog of items 258 can include incomplete or non-descriptive titles. Although such items can be relevant to a generated interface, items having incomplete or non-descriptive titles are less likely to be selected for inclusion in an interface, as they are less likely to match the criteria for selection, e.g., search query, context, user personalization, etc. Augmented titles include modified titles for an item that incorporates one or more programmatically recommended keywords or modifications that are adapted to increase the relevance of the item title with respect to the interface or platform.

At step 206, an interface 270 is generated including the at least one item 260 having an augmented title. The at least one item 260 can be displayed in any suitable portion of the interface 270. For example, when the request 252 includes a search query, the interface 270 can include a search result interface including the at least one item 260 within the displayed search results. As another example, when the request 252 includes a request for an interface page including a recommended item section, the at least one item 260 can be included as one of the recommended items within the recommended item section. It will be appreciated that the at least one item 260 can be incorporated into an interface 270 in any suitable location based on the layout of the interface 270 and/or the composition of the at least one item 260.

The task of identifying relevant content on an interface, such as navigating expansive electronic catalogs of items to locate specific items of interest can be burdensome and time consuming for users, especially if the items lack expected descriptors or keywords that a user may use to identify relevant items. Typically, a user can locate items within a catalog by navigating a browse structure, sometimes referred to as a "browse tree," in which interface pages or items are arranged in a predetermined hierarchy, such as by categories or sub-categories. Such browse trees typically include multiple hierarchical levels, requiring users to navigate through several levels of browse nodes or categories to identify items of interest. Thus, the user frequently has to perform numerous navigational steps to arrive at an interface pages containing items of interest.

Interface catalogs including keyword-augmented titles and systems configured to generate keyword augmented titles, as disclosed herein, significantly reduce this problem, allowing users to locate items of interest with fewer steps. For example, in some embodiments described herein, when a user is presented with one or more items, each item includes, or is in the form of, a link to an interface page corresponding to the item of interest, e.g., a product or item page. Each recommendation thus serves as a programmatically selected navigational shortcut to an interface page, allowing a user to bypass the navigational structure of the browse tree. Beneficially, programmatically modifying item titles within a catalog to include recommended keywords increases the likelihood of items of interest being included in the generated interface, thus presenting a user with navigations shortcuts to these items and improving the speed of the user's navigation through an electronic interface. This can be particularly beneficial for computing devices with small screens, where fewer interface elements can be displayed to a user at a time and thus navigation of larger volumes of data is more difficult.

Figure 8:
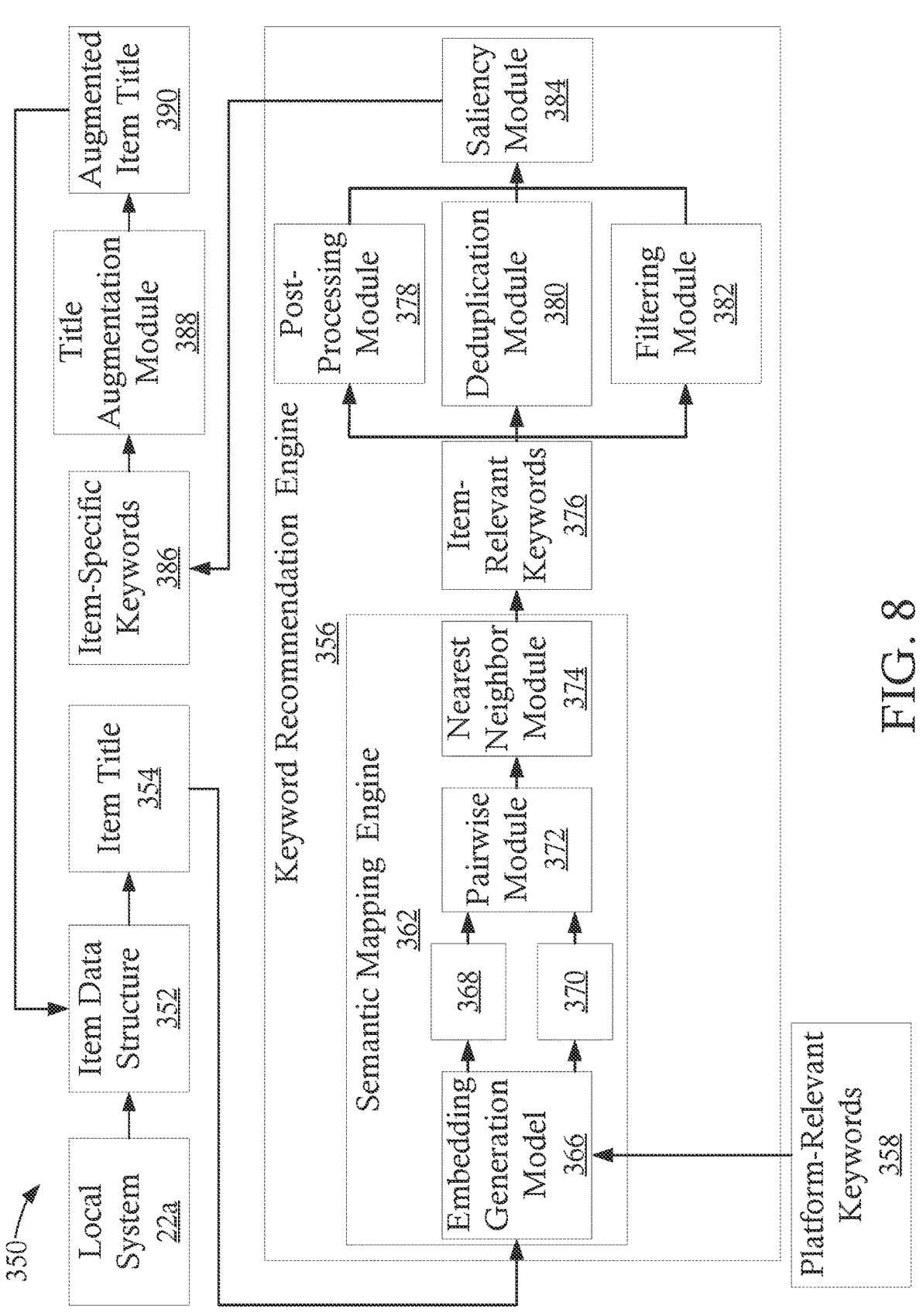
FIG. 8 is a process flow illustrating various steps of the method of generating keyword-augmented titles, in accordance with some embodiments.

FIG. 7 is a flowchart illustrating a method 300 of generating an augmented title for an item, in accordance with some embodiments. FIG. 8 is a process flow 350 illustrating various steps of the method 300 of generating an augmented title for an item, in accordance with some embodiments. At step 302, an item data structure 352 representative of an item is received. The item data structure 352 includes a data structure configured to store information related to the represented item. For example, in various embodiments, the item data structure 352 can include, but is not limited to, an item title, item description, item image, item price, item catalog identifier, etc. The item data structure 352 can include any suitable data structure, such as a database file (e.g., document). The item data structure 352 can be received from any suitable source, such as a user system 22a, 22b or a storage system, such as an item database 32.

In some embodiments, the item data structure 352 is generated as part of a process of adding a new item to an item catalog. For example, a user can interact with a user system 22a, 22b to obtain an item-generation interface. The item-generation interface is configured to allow a user to define various elements of the item which are incorporated into an item data structure 352. In some embodiments, methods of generating item-specific keyword recommendation and an augmented title, discussed herein can be performed simultaneously with and/or subsequently to creation of an item in an item catalog via the item-generation interface.

At step 304, a portion of the item data structure 352, such as an item title 354, is provided to a keyword recommendation engine 356. The item title 354 can be extracted from the item data structure 352 prior to being provided to the keyword recommendation engine 356 and/or the keyword recommendation engine 356 can be configured to extract the item title 354 from the item data structure 352. In some embodiments, additional elements of the item data structure 352 can be provided to the keyword recommendation engine 356.

At step 306, the item title 354 is semantically mapped to platform-relevant keywords 360 to generate a set of item-relevant keywords. The platform-relevant keywords 360 (or a representation of the platform-relevant keywords 360) can be obtained from any suitable storage mechanism, such as, for example, the keyword database 34. In some embodiments, the item title 354 and the platform-relevant keywords 360 are semantically mapped by a semantic mapping model 362. The semantic mapping model 362 is configured to receive the item title 354 and the platform-relevant keywords 360 and generate a set of item-relevant keywords 364. The set of item-relevant keywords 376 includes keywords that are missing from and/or are likely to enhance the item title 354 of the item data structure 352.

In some embodiments, the semantic mapping model 362 is configured to perform semantic mapping based on embeddings generated for the item title 354 (or elements of the item title 354) and the platform-relevant keywords 360. For example the semantic mapping model 362 can include one or more embedding generation layers or models 366 configured to generate embeddings for the item title 354 (e.g., item embedding 368) and/or the platform-relevant keywords 360 (e.g., keyword embedding 370). The item embeddings 368 include an embedding generated for the entire item title 354 and/or can include a plurality of embeddings generated for portions of the item title 354, such as each word or phrase in the item title 354. Similarly, the platform-relevant keywords 360 can include individual words or phrases and the keyword embeddings 370 can be representative of the individual words and/or phrases of the platform-relevant keywords 360.

The semantic mapping model 362 can include any suitable embedding generation models (or layers) configured to convert the textual item title 354 and/or textual platform-relevant keywords 360 into relevant, vector-space embedding representations 368, 370. Suitable models can include, but are not limited to, a pre-trained bidirectional encoder representation from transformers (BERT) model, a word2vec model, a global vectors for word representation (GloVe) model, and/or other suitable language or embedding models.

Figure 9:
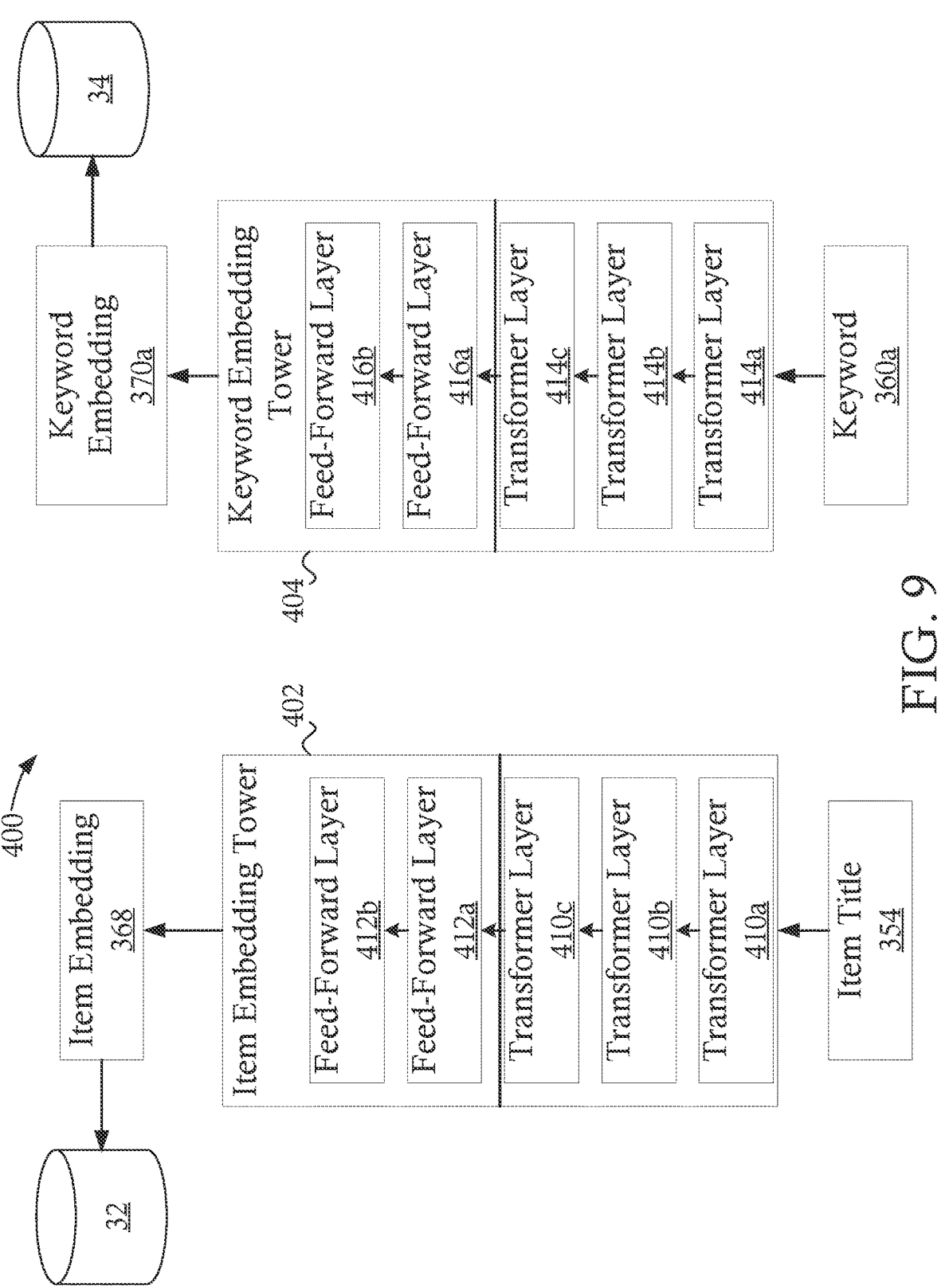
FIG. 9 illustrates a two-tower semantic mapping model, in accordance with some embodiments.

In some embodiments, an embedding generation model 366 includes a two-tower model 400, as illustrated in FIG. 9. The two-tower model 400 includes an item embedding tower 402 and a keyword embedding tower 404. The item embedding tower 402 and the keyword embedding tower 404 are each configured to receive an input, such as an item title 354 for the item embedding tower 402 or a platform-relevant keyword 360a for the keyword embedding tower 404, and generate an embedding, such as an item embedding 368a for the item embedding tower 402 or a keyword embedding 370a for the keyword embedding tower 404.

Each of the item embedding tower 402 and the keyword embedding tower 404 include a plurality of layers 410a-410c, 412a-412b, 414a-414c, 416a-416b configured convert an input into an embedding representation. For example, in the illustrated embodiment, each of the towers 402, 404 include a plurality of transformer layers 410a-410c, 414a-414c and a plurality of feedforward layers 412a-412b, 416a-416b that are configured to convert a textual input 354, 360a to an embedding 368, 370a. Although embodiments are illustrated having similar tower structures, it will be appreciated that the item embedding tower 402 and the keyword embedding tower 404 can include different model architectures configured to generate item embeddings 368 and keyword embeddings 370a, respectively. In addition, although embodiments are illustrated including a plurality of transformer layers 410a-410c, 414a-414c and a plurality of feedforward layers 412a-412b, 416a-416b, it will be appreciated that any suitable embedding generation architecture can be used. For example, suitable models can include, but are not limited to, a pre-trained bidirectional encoder representation from transformers (BERT) model, a word2vec model, a global vectors for word representation (GloVe) model, and/or other suitable language or embedding models.

In some embodiments, each of the generated item embeddings 368a are stored in a data storage mechanism, such as an item database 32. Similarly, in some embodiments, each of the generated keyword embeddings 370a are stored in a data storage mechanism, such as a keyword database 34. Each of the towers 402, 404 can be executed simultaneously, sequentially, and/or asynchronously. For example, in some embodiments, the keyword embedding tower 404 can be executed on a set of platform-relevant keywords as a background workflow prior to, simultaneously with, and/or after deployment of a two-tower model 400, to generate a set of existing keyword embeddings 370a that are stored in a keyword database 34. Similarly, the item embedding tower 402 can be executed as a background workflow to generate recommended embedding for existing items within an item catalog, such as items included within an item database 32. It will also be appreciated that the item embedding tower 402 and/or the keyword embedding tower 404 can be executed in real-time as new items and/or keywords are received, for example, when a new item is added to a catalog or a domain having a new set of keyword is added to a keyword database 34.

In some embodiments, the semantic mapping model 362 includes a pairwise distance module 372 configured to determine a pairwise distance between an item embedding 368 and a keyword embedding 370. The pairwise distance provides a distance between the embeddings 368, 370 representative of a similarity between the embeddings. In some embodiments, embeddings having smaller pairwise distances are representative of similar semantic meanings, while embeddings having larger pairwise distances are representative of different semantic meanings. Although embodiments are discussed herein including pairwise distance, it will be appreciated that any suitable similarity determination can be used. The pairwise distance can be calculated using any suitable process and for any suitable dimensions, such as, for example, a pairwise distance within embedding vector space.

In some embodiments, the semantic mapping model 362 includes a nearest neighbor module 374 configured to generate a set of item-relevant keywords 364 based on a nearest neighbor determination. A nearest neighbor determination can include finding a second embedding or set of second embeddings that are closest to or within a predetermined distance of a first embedding. For example, in some embodiments, the nearest neighbor module 374 is configured to select a set of platform-relevant keyword embeddings 370 that are within a predetermined distance of an item embedding 368 in vector space.

Figure 10:
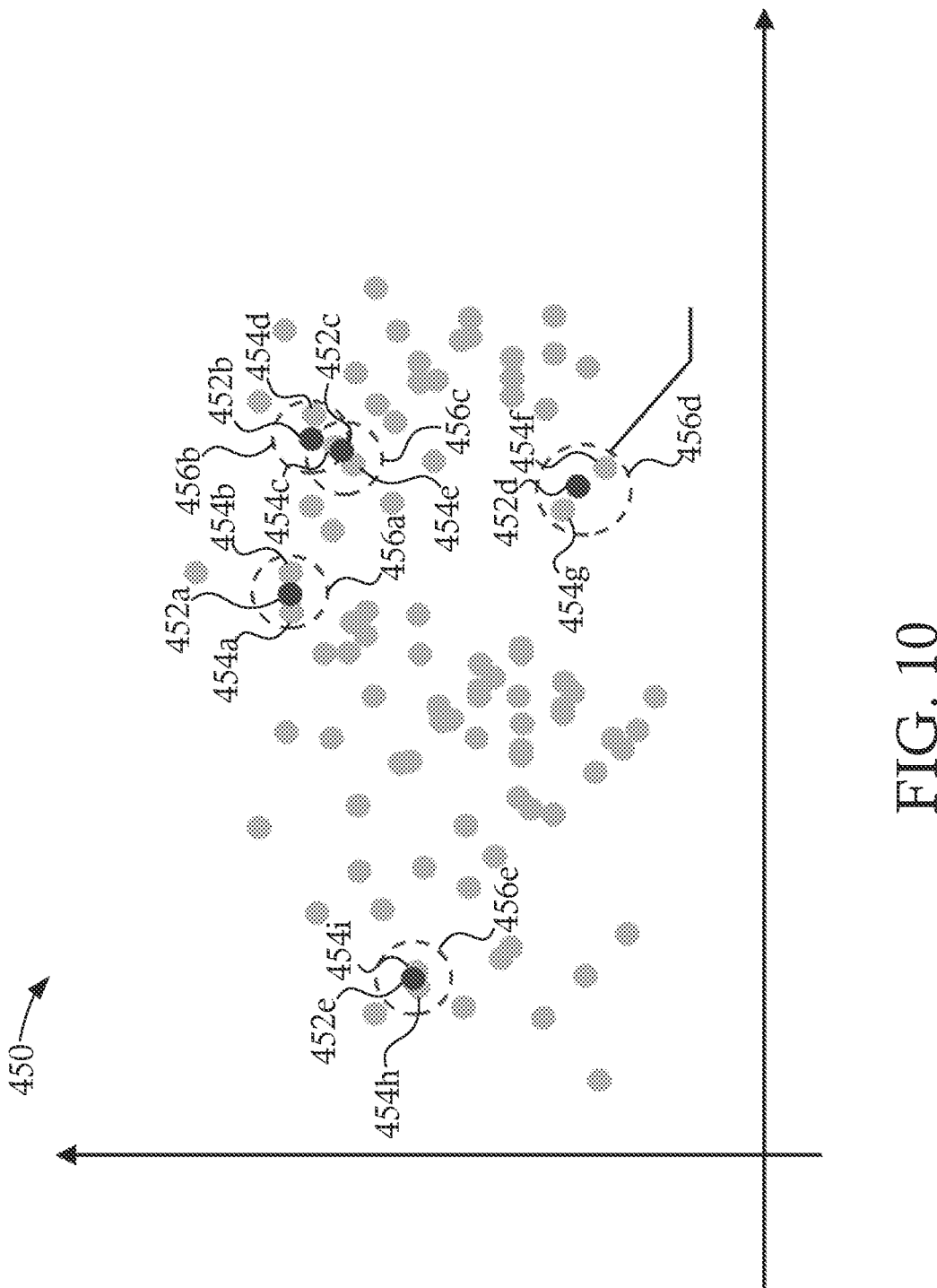
FIG. 10 is a graph illustrating a vector embedding space including a plurality of item embeddings and a plurality of keyword embeddings, in accordance with some embodiments.

FIG. 10 is a graph illustrating a vector embedding space 450 include a plurality of item embeddings 452a-452e and a plurality of keyword embeddings 454a-454i shown in the vector embedding space 450. In some embodiments, a nearest neighbor module 374 is configured to identify all keyword embeddings 454a-454i that are positioned within a predetermined distance of an item embedding 452a-452e generated from an item title. For example, in the illustrated embodiment, an item title is converted into five distinct item embeddings 452a-452e. Each circle 456a-456e represents a predetermined distance from one of the item embeddings 452a-452e. The nearest neighbor module is configured to select the keyword embeddings 454a-454i that are with the circles 456a-456e, i.e., that are within in a predetermine distance of one of the item embeddings 452a-452e. The selected keyword embeddings 454a-454i are representative of a set of item-relevant recommended keywords. Although specific embodiments are discussed herein including nearest neighbor, it will be appreciated that any suitable determination, such as a clustering or distance determination, can be used to identify similar embeddings.

With reference again to FIGS. 7-8, a set of item-relevant keywords 376 is output from the semantic mapping model 362. For example, as discussed above, in some embodiments, the set of item-relevant keywords 376 includes keywords having a keyword embedding 370 located within a predetermined distance of at least one item embedding 368 generated from an item title 354 of a relevant item.

At step 308, post-processing is applied to the set of item-relevant keywords 376. Post-processing can include any suitable steps configured to normalize, reduce, and/or filter the set of item-relevant recommended keywords. For example, in some embodiments, the keyword recommendation engine 356 includes a post-processing module 378 configured to apply one or more post-processing processes, such as removal of a set of predetermined words, word filtering, facet info mismatch filter, and/or any other suitable post-processing.

In some embodiments, the post-processing module 378 is configured to remove a set of predetermined removal words from the set of item-specific relevant keywords. A set of predetermined removal words can include competitor or trademarked names. For example, in embodiments including an e-commerce environment, the set of item-relevant keywords can be filtered to remove retailer names, such as competitor names and/or the name of the entity controlling the e-commerce environment. Similarly, the set of predetermined removal words can include "stop words," e.g., words that should be stopped from appearing in item titles. Stop words can include superlatives and/or other terms that fail to provide information regarding an item, such as "top rated," "best," etc. The set of predetermined removal words can be defined by one or more dictionaries, such as a retailer name dictionary, a stop-word dictionary, a bad-term dictionary, an obscene or pejorative word database, and/or any other dictionary configured to remove undesirable and/or unhelpful words.

In some embodiments, the post-processing module 378 includes a regular-expression text modifier configured to modify item-relevant keywords to remove words identified in a removal dictionary. The regular-expression text modifier can be configured to eliminate words included in the removal dictionary and/or replace words in the removal dictionary with substitute terms.

In some embodiments, the post-processing module 378 applies an uncommon word-filtering process configured to remove overly specific or rare keywords from the set of item-relevant keywords. In some embodiments, a dictionary, or bag, of common or frequent words is defined by counting a frequency of words in each keyword in the keyword database 34 and removing words having a frequency below a predetermine threshold (e.g., removing uncommon words). Non-matches between the dictionary of common words are removed from the set of item-relevant keywords. Uncommon words can include, for example, overly specific descriptors such as model or sub-model designations, specific parameters of an instance of an item having multiple versions, etc. In some embodiments, post-processing for each of predetermined removal words and the uncommon words can occur simultaneously and/or based on combined dictionaries/bags.

At step 310, keyword deduplication is applied to the set of item-relevant keywords. For example, in some embodiments, the keyword recommendation engine 356 includes a keyword deduplication module 382 configured to remove keywords that are repeats or substantially similar to words already in the item title 354 and/or included in prior keyword recommendations generated for the item title 354. The keyword deduplication module 382 can utilize any suitable deduplication process, such as, for example, keyword comparison, lemmatization, embedding-based deduplication, and/or any other suitable process.

In some embodiments, deduplication between a set of item-relevant keywords and an item title 354 is preformed by direct comparison, or lemmatization, between a keyword and the item title 354. If a recommended keyword matches a word already present in the item title 354, the recommended keyword can be removed from and/or deemphasized in the set of item-relevant keywords. For example, if all of the words in a keyword recommendation are included in the item title 354, the keyword recommendation can be removed from the set of item-relevant keywords. Similarly, if some of the words in a keyword recommendation are included in the item title 354, the recommended keyword can be removed from the set of item-relevant keywords or, alternatively, the matching words can be deemphasized (or non-matching portions of the keyword emphasized) when displaying a keyword recommendation, as discussed in greater detail below.

In some embodiments, the keyword deduplication module 382 is configured to apply a lemmatization based deduplication process between recommended keywords. For example, a first keyword recommendation can be compared to a second keyword recommendation. Terms in the second keyword recommendation that match terms in the first keyword recommendation can be deemphasized when the second keyword recommendation is presented to a user, as discussed in greater detail below.

In some embodiments, the keyword deduplication module 380 is configured to apply an embedding-based deduplication process. For example, a keyword embedding representative of a first keyword can be compared to a second keyword embedding representative of a second keyword. The embeddings can be generated using any suitable embedding generation process. For example, the keyword embeddings 370 generated by the embedding generation model 366 can be compared for the first keyword and the second keyword. Alternatively, a trained model 500 can be configured to generate and compare embeddings, as illustrated in FIG. 11.

Figure 11:
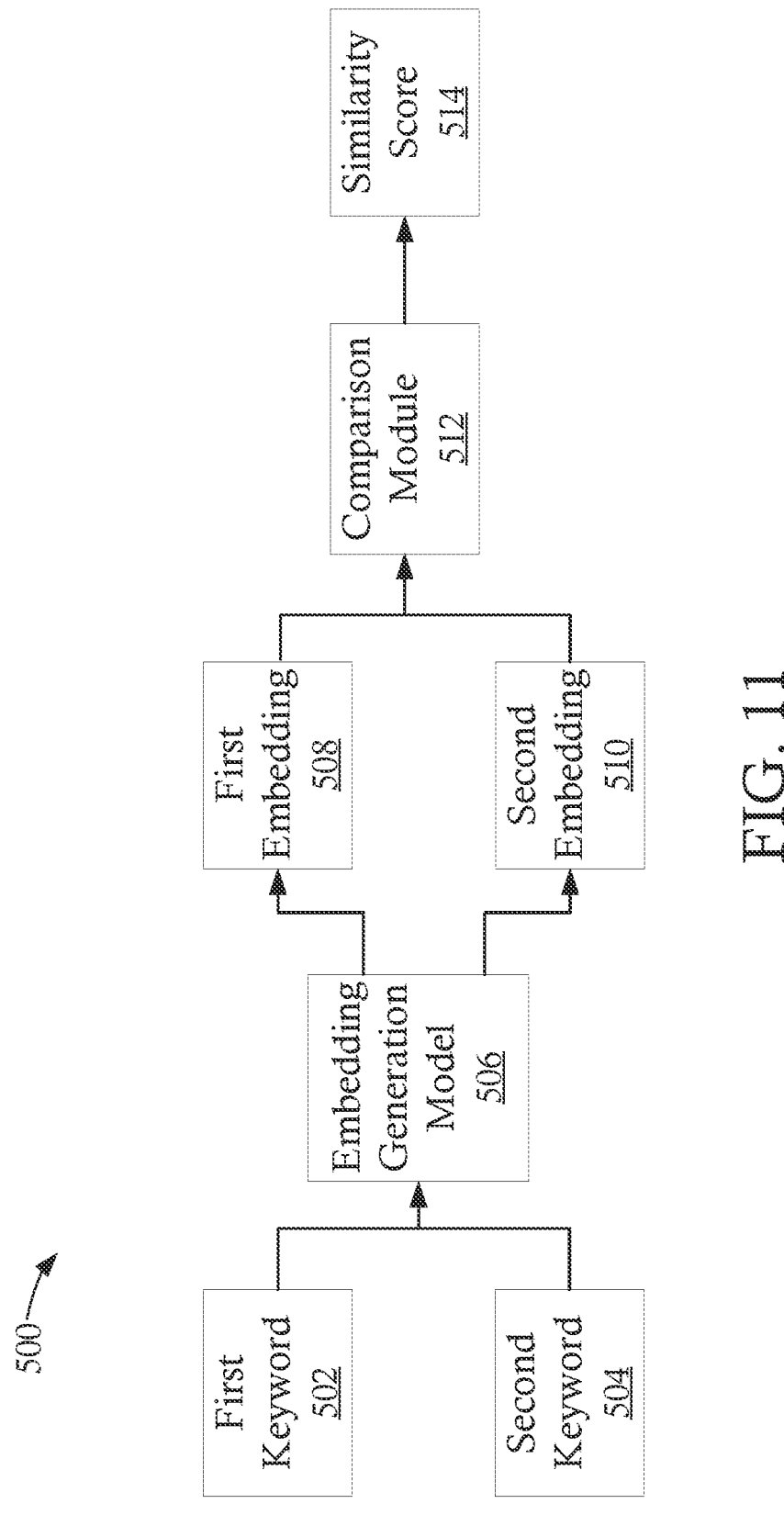
FIG. 11 illustrates an embedding-based deduplication framework, in accordance with some embodiments.

As shown in FIG. 11, a first keyword 502 and a second keyword 504 are provided to an embedding generation module 506. The embedding generation module 506 can implement any suitable embedding generation process or model, such as, for example, a sentence BERT embedding model. The embedding generation module 506 generates a first embedding 508 representative of the first keyword 502 and a second embedding 510 representative of the second keyword 504. The first embedding 508 and the second embedding 510 are compared by a comparison module 512 to determine a similarity between the embeddings 508, 510. For example, in some embodiments, the comparison module 512 is configured to determine a similarity score 514 based on a cosine similarity between the first embedding 508 and the second embedding 510. If the similarity score 514, e.g., the cosine similarity score, is above a predetermined threshold, the second keyword is removed from the set of item-relevant keywords 376.

With reference again to FIGS. 7-8, at step 312, the set of item-relevant keywords 376 are filtered to remove facet mis-matched terms or keywords. For example, in some embodiments, the keyword recommendation engine 356 includes a filtering module 382 configured to filter facet mis-matched terms or keywords. A facet mis-match includes a keyword or portion of a keyword (e.g., term, individual name or word, etc.) that is incompatible or mis-matched with a similar facet of the item data structure 352 and/or the item title 354. Item facets can include, but are not limited to, brand, color, size, etc. For example, if an item title 354 includes a first brand name or a first attribute, such as a first color, for an item, the item-relevant keywords can include brand names for other brands that are different than the first brand name, e.g., second brand names, and/or attribute identifiers that are different than the first attribute, such as a second color. Facet mis-matched keywords or terms can be included in the item-specific recommended keywords if those terms are within a predetermined distance of an embedding representation of one or more terms in the item title 354. However, despite the semantic similarity, facet mis-matched keywords would be inappropriate or confusing to include in an item title. For example, an item that is brand X would not want to include brand Y in the title, and therefore brand Y is removed from the set of item-relevant keywords. Similarly, an item that is color A would not want to include color B in the title, and therefore color B is removed from the set of item-relevant keywords. Thus, facet mis-matching filtering prevents inclusion or suggestion of incongruous or incorrect keywords in the item title.

In some embodiments, a saliency detection module 384 is configured to identify and emphasize unique terms within the identified keywords. For example, a set of keywords for an item having an item title 354 of "BRAND 3in1 Electric Blender Mixer Chopper Grinder Multi Function Food Fruit Processor" can include:

HANDHELD chopper blender
IMMERSION blender
hand blender food processor COMBO
SMART POWER blender
CHEF PRO PLUS mixer grinder A saliency detection module 384 can be configured to emphasized terms or sub-portions of keywords, highlighting the unique portions of a keyword that do not appear in the current item title 354, and non-emphasized portions that already appear in the item title and/or have been emphasized in a prior keyword. As another example, a set of keywords for an item having an item title 354 of "BRAND M8 Cordless Vacuum Cleaner, 4 in Lightweight Stick Vacuum" can include:

PORTABLE cordless vacuum cleaner
RECHARGEABLE vacuum
Cordless STAIR vacuum cleaner Although specific embodiments are discussed herein, it will be appreciated that any suitable process can be used to identify and/or emphasize unique portions of suggested keywords.

At step 314, a set of item-specific recommended keywords 386 is generated. The set of item-specific recommended keywords 386 include item-relevant keywords 376 that were not removed or de-emphasized during post-processing. The set of item-specific recommended keywords 386 includes only those keywords or terms that are recommended for insertion into an item title and/or can include keywords having suggested terms and pre-existing/non-suggested terms. For example, the set of item-specific recommended keywords 386 for a first item can include a suggestion to add a first word or term from a first keyword and/or a suggestion to add the first keyword including the first word or term. In some embodiments, only the terms or portions of an item-specific recommended keyword 386 that are not included in the item title 354 are provided.

At step 316, an augmented item title 390 is generated. The augmented item title 390 can be generated automatically and/or through user interaction. For example, in some embodiments, a title augmentation module 388 is configured to receive the item title 354 and a set of the item-specific recommended keywords 386 and generate an augmented or updated item title 390. For example, in some embodiments, the title augmentation module 388 is configured to receive the first N item-specific recommended keywords 386, where N is a positive integer, although it will be appreciated that any suitable process, such as ranking processes, can be applied to select the set of item-specific recommended keywords 386 provided to the title augmentation module 388.

The title augmentation module 388 can include any suitable models or processes configured to insert the set of recommended augmentation keywords 386 into the item title 354. In some embodiments, the title augmentation module 388 is configured to insert item keywords, or portions of item keywords, in the set of item-specific recommended keywords 386 based on matching of the keywords to portions of the item title 354. For example, as discussed above an item having an item title 354 of "BRAND M8 Cordless Vacuum Cleaner, 4 in Lightweight Stick Vacuum" can generate a set of item-specific recommended keywords 386 including "PORTABLE cordless vacuum cleaner", "RECHARGEABLE vacuum", and "Cordless STAIR vacuum cleaner." The title augmentation module 388 can be configured to insert, for example, the first two recommended augmentation keywords in the set of item-specific recommended keywords 386. The title augmentation module 388 can perform matching of non-emphasized (e.g., preexisting) terms in the first two recommended augmentation keywords to determine where insertion of the emphasized terms should occur, e.g., generating an augmented item title 390 of "BRAND M8 PORTABLE Cordless RECHARGEABLE Vacuum Cleaner, 4 in Lightweight Stick Vacuum."

In some embodiments, the set of item-specific recommended keywords 386 is presented to a user, for example, via an item-generation interface utilized by a user to add a new item to an existing item catalog. A user can select one or more of the identified item-specific recommended keywords 386 for insertion into the item title 354 of the item data structure 352 being generated through the interface. Selection of an item-specific recommended keywords can automatically update the item title 354 to generate the augmented item title 390 and/or a user can manually update the item title 354 to generate an augmented item title 390.

At step 318, the item data structure 352 is updated to include the augmented item title 390 and added to or updated within the catalog of items associated with a platform. As discussed above, items in the item catalog can be presented to users in response to requests for user interfaces, such as search requests and/or requests for interfaces including recommended or suggested items. The augmented item title 390 provides for a higher likelihood that the item data structure 352 will be provided as a relevant result to a user via a user interface.

The task of correctly labeling content for inclusion in an interface, such as items included in expansive electronic catalogs of items, can be burdensome and time consuming for users, especially if a large number of items must be generated or uploaded at a high interval, for example, as typically found in high turnover retail items. Typically, a user must generate their own titles or names based on guesses regarding what terms will be relevant or helpful for inserting the item into an interface. This requires a user to locate and compare similar items or requires an existing basis of knowledge for a relevant domain. Thus, the user frequently has to perform numerous steps to determine an appropriate item title. Commonly, item titles are incomplete or inaccurate due to the lack of knowledge regarding relevant terms or keywords for inclusion in the title.

Systems for generating keyword-augmented titles, as disclosed herein, significantly reduce this problem, allowing users to automatically identify keywords that are platform-specific and that are likely to be relevant to the item being added to a catalog. For example, in some embodiments described herein, when a user is creates a new item document in a database, the item includes, or is in the form of, a link to an interface page corresponding to the item of interest, e.g., a product or item page. In order to be adequately delivered on the platform, and therefore allow each item to serve as a programmatically selected navigational shortcut to an interface page, the item title must accurately reflect a description of the item in the context of the platform. Beneficially, programmatically modifying item titles within a catalog to include recommended keywords from a set of platform-specific keywords increases the likelihood of items of interest being included in the generated interface, thus ensuring a user is presented with relevant navigations shortcuts to items and improving the speed of the user's navigation through an electronic interface. This can be particularly beneficial for computing devices with small screens, where fewer interface elements can be displayed to a user at a time and thus navigation of larger volumes of data is more difficult.

Figure 12:
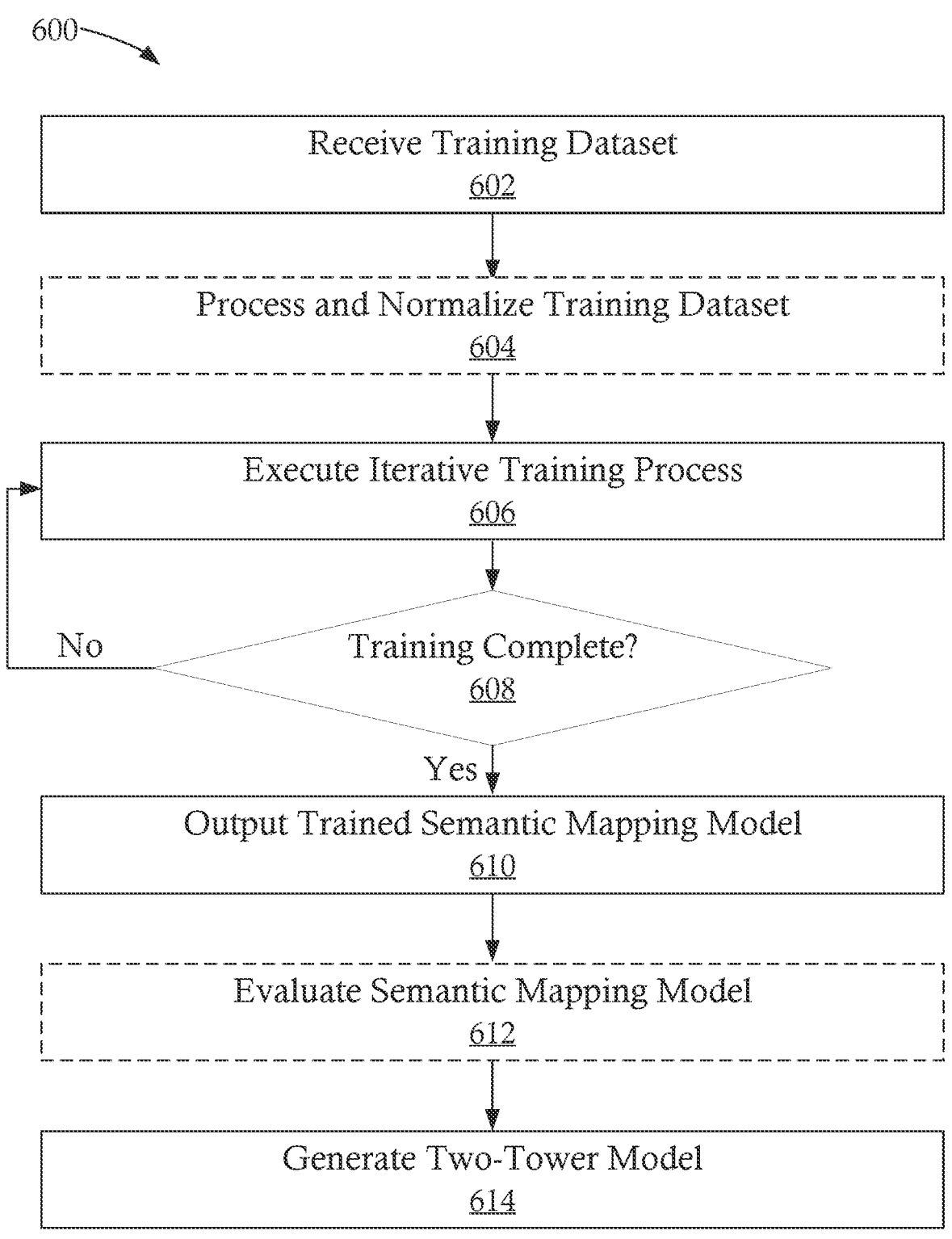
FIG. 12 is a flowchart illustrating a method of generating a semantic mapping model, in accordance with some embodiments.
Figure 13:
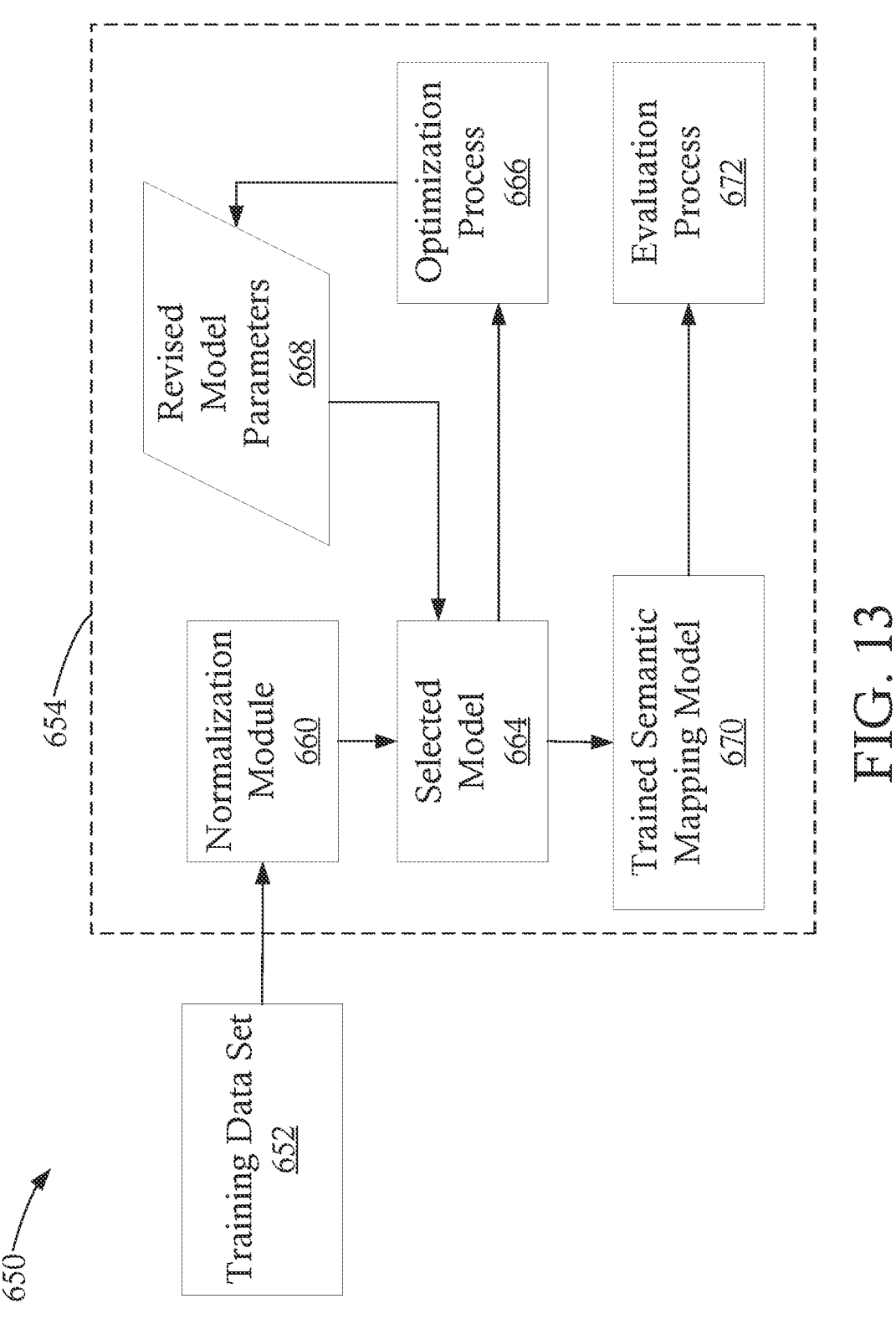
FIG. 13 is a process flow illustrating various steps of the method of generating a semantic mapping model, in accordance with some embodiments.

FIG. 12 is a flowchart illustrating a method 600 of generating a semantic mapping model, in accordance with some embodiments. FIG. 13 is a process flow 650 illustrating various steps of the method 600 of generating a semantic mapping model, in accordance with some embodiments. At step 602, a training dataset 652 is received by model training engine 654. The training dataset 652 can include labeled and/or unlabeled data. For example, in some embodiments, a semantic mapping model is generated using unlabeled data.

In some embodiments, the training dataset 652 can include keyword and/or item titles. The set of keyword and/or item titles included in the training dataset 652 can be taken from a catalog of items, such as a catalog of items having known good titles and/or known good keywords. In some embodiments, the training dataset 652 includes a large dataset incorporating a variety of item titles and keywords. As one example, in an e-commerce context, the training dataset 652 can include first-party items and keywords selected from a catalog of items associated with the e-commerce platform. Although specific embodiments are discussed herein, it will be appreciated that any suitable training dataset 652 can be used.

At optional step 604, the received training dataset 652 is processed and/or normalized by a normalization module 660. In some embodiments, processing of the received training dataset 652 includes outlier detection configured to remove data likely to skew training of a semantic mapping model, such as keywords or titles in a second language, numerical keywords, etc.

At step 606, an iterative training process is executed to train a selected model 664. For example, a model training engine 654 can be configured to obtain a selected model 664 including an untrained (e.g., base) machine learning model, such as a semantic framework, and/or a partially or previously trained model (e.g., a prior version of a trained semantic mapping model, a partially trained model from a prior iteration of a training process, etc.), from a model store, such as a model store database 36. The model training engine 654 is configured to iteratively adjust parameters (e.g., hyperparameters) of the selected model 664 to minimize a cost value (e.g., an output of a cost function) for the selected model 664. In some embodiments, the cost value is related to a difference between an input value, e.g., a title, term, or keyword, and a decoded embedding.

In some embodiments, the model training engine 654 implements an iterative training process that generates a set of revised model parameters 668 during each iteration. The set of revised model parameters 668 can be generated by applying an optimization process 666 to the cost function of the selected model 664. The optimization process 666 can be configured to reduce the cost value (e.g., reduce the output of the cost function) at each step by adjusting one or more parameters during each iteration of the training process.

After each iteration of the training process, at step 608, the model training engine 654 determines whether the training process is complete. The determination at step 608 can be based on any suitable parameters. For example, in some embodiments, a training process can complete after a predetermined number of iterations. As another example, in some embodiments, a training process can complete when it is determined that the cost function of the selected model 664 has reached a minimum, such as a local minimum and/or a global minimum.

At step 610, a trained semantic mapping model 670 is generated and, at optional step 612, a trained semantic mapping model 670 can be evaluated by an evaluation process 672. The trained semantic mapping model 670 can be evaluated based on any suitable metrics, such as, for example, an F or FI score, normalized discounted cumulative gain (NDCG) of the model, mean reciprocal rank (MRR), mean average precision (MAP) score of the model, and/or any other suitable evaluation metrics. Although specific embodiments are discussed herein, it will be appreciated that any suitable set of evaluation metrics can be used to evaluate a trained semantic mapping model.

At step 614, a two-tower model 674 is generated by duplicating the trained semantic mapping model 670a, 670b for two different inputs, e.g., an item title input and a keyword input. The two-tower model 674 can be stored in a model store database 36 and/or deployed for use in a semantic mapping model 362.

Although the subject matter has been described in terms of exemplary embodiments, it is not limited thereto. Rather, the appended claims should be construed broadly, to include other variants and embodiments, which can be made by those skilled in the art.

What is claimed is:
1. A system, comprising:
a non-transitory memory storing instructions; and
a processor communicatively coupled to the non-transitory memory, wherein the instructions, when executed, cause the processor to:

receive, from a database, an item data structure including an item title;

input the item data structure to a first embedding generating tower of a first trained semantic mapping model and generate at least one item embedding, wherein the first trained semantic mapping model includes a first semantic mapping framework;

input a set of platform-relevant keywords to a second embedding generating tower of the first trained semantic mapping model and generate a set of keyword embeddings;

compare the at least one item embedding to the set of keyword embeddings representative of the set of platform-relevant keywords and determine a similarity between the at least one item embedding and each embedding in the set of keyword embeddings;

select a set of item-specific recommended keywords from the set of platform-relevant keywords based on the similarities;

determine a match between at least one item-specific recommended keyword in the set of item-specific recommended keywords and the item title;

modify the item title to include the at least one item-specific recommended keyword in the set of item-specific recommended keywords based on the determined match;

update the item data structure to include the modified item title;

receive a search query; and generate an interface responsive to the search query, wherein the interface includes the item data structure and the modified item title.

2. The system of claim 1, wherein the set of keyword embeddings are generated by a second trained semantic mapping model, and wherein the second trained semantic mapping model includes the first semantic mapping framework.

3. The system of claim 1, wherein the at least one item embedding is compared to the set of keyword embeddings by determining a pairwise distance between the at least one item embedding and each embedding in the set of keyword embeddings in vector space.

4. The system of claim 3, wherein the set of item-specific recommended keywords includes keywords associated with keyword embeddings located within a predetermined pairwise distance of the at least one item embedding in vector space.

5. The system of claim 1, wherein the set of keyword embeddings are generated prior to receiving the item data structure.

6. The system of claim 1, wherein the processor is configured to read the set of instructions to filter the set of recommended augmentation keywords to remove a set of removal words.

7. The system of claim 1, wherein the processor is configured to read the set of instructions to deduplicate the set of item-specific recommended keywords based on the item title.

8. The system of claim 1, wherein the processor is configured to read the set of instructions to deduplicate the set of item-specific recommended keywords based on a prior item-specific recommended keyword.

9. The system of claim 8, wherein the deduplication includes:

generating a first embedding for the prior item-specific recommended keyword using a second semantic mapping model, wherein the second semantic mapping model includes a second semantic mapping framework;

generating a second embedding for a next item-specific recommended keyword in the set of item-specific recommended keywords using the second semantic mapping model;

determining a similarity between the first embedding and the second embedding; and deduplicating the next item-specific recommended keyword when the similarity is above a predetermined threshold.

10. The system of claim 1, wherein modifying the item title includes augmenting the item title with the at least one item-specific recommended keyword in the set of item-specific recommended keywords.

11. A computer-implemented method, comprising:

receiving, from a database, an item data structure including an item title;

inputting the item data structure to a first embedding generating tower of a first trained semantic mapping model and generating at least one item embedding, wherein the first trained semantic mapping model includes a first semantic mapping framework;

inputting a set of platform-relevant keywords to a second embedding generating tower of the first trained semantic mapping model and generate a set of keyword embeddings;

comparing the at least one item embedding to the set of keyword embeddings representative of the set of platform-relevant keywords and determining a similarity between the at least one item embedding and each embedding in the set of keyword embeddings;

selecting a set of item-specific recommended keywords from the set of platform-relevant keywords based on the similarities;

determining a match between at least one item-specific recommended keyword in the set of item-specific recommended keywords and the item title;

modifying the item title to include at least one of the set of item-specific recommended keywords based on the determined match;

updating the item data structure to include the modified item title;

receiving a search query; and generating an interface responsive to the search query, wherein the interface includes the item data structure and the modified item title.

12. The computer-implemented method of claim 11, wherein the set of keyword embeddings are generated by a second trained semantic mapping model, and wherein the second trained semantic mapping model includes the first semantic mapping framework.

13. The computer-implemented method of claim 11, wherein the at least one item embedding is compared to the set of keyword embeddings by determining a pairwise distance between the at least one item embedding and each embedding in the set of keyword embeddings in vector space.

14. The Previously Presented of claim 13, wherein the set of item-specific recommended keywords includes keywords associated with keyword embeddings located within a predetermined pairwise distance of the at least one item embedding in vector space.

15. The computer-implemented method of claim 11, wherein the set of keyword embeddings are generated prior to receiving the item data structure.

16. The computer-implemented method of claim 11, comprising filtering the set of item-specific recommended keywords to remove a set of removal words.

17. The computer-implemented method of claim 11, comprising deduplicating the set of item-specific recommended keywords based on the item title.

18. The computer-implemented method of claim 11, comprising deduplicating the set of item-specific recommended keywords based on a prior item-specific recommended keyword.

19. The computer-implemented method of claim 18, wherein the deduplication includes:

generating a first embedding for the prior item-specific recommended keyword using a second semantic mapping model, wherein the second semantic mapping model includes a second semantic mapping framework;

generating a second embedding for a next item-specific recommended keyword in the set of recommended augmentation keywords using the second semantic mapping model;

determining a similarity between the first embedding and the second embedding; and deduplicating the next item-specific recommended keyword when the similarity is above a predetermined threshold.

20. A non-transitory computer-readable medium having instructions stored thereon, wherein the instructions, when executed by at least one processor, cause a device to perform operations comprising:

receiving, from a database, an item data structure including an item title;

inputting the item data structure to a first embedding generating tower of a first trained semantic mapping model and generating at least one item embedding, wherein the first trained semantic mapping model includes a first semantic mapping framework;

inputting a set of platform-relevant keywords to a second embedding generating tower of the first trained semantic mapping model and generate a set of keyword embeddings;

comparing the at least one item embedding to the set of keyword embeddings representative of the set of platform-relevant keywords and determining a similarity between the at least one item embedding and each embedding in the set of keyword embeddings;

selecting a set of item-specific recommended keywords from the set of platform-relevant keywords based on the similarities;

determining a match between at least one item-specific recommended keyword in the set of item-specific recommended keywords and the item title;

modifying the item title to include at least one of the set of item-specific recommended keywords based on the determined match;

updating the item data structure to include the modified item title;

receiving a search query; and generating an interface responsive to the search query, wherein the interface includes the item data structure and the modified item title.

21. The non-transitory computer readable medium of claim 20, wherein the instructions, when executed by the at least one processor, cause the device to perform operations comprising:

identifying a first keyword recommendation in the set of item-specific recommended keywords;

generating a first embedding for the first keyword recommendation using a third semantic mapping model, wherein the third semantic mapping model includes a second semantic mapping framework;

generating a second embedding for a next keyword recommendation in the set of item-specific recommended keywords using the second semantic mapping model;

determining a similarity between the first embedding and the second embedding; and deduplicating the next keyword recommendation when the similarity is above a predetermined threshold.

\* \* \* \* \*